United States Patent
Zak, Jr. et al.

(10) Patent No.: US 8,548,968 B2
(45) Date of Patent: Oct. 1, 2013

(54) VEHICLE IDENTIFICATION NUMBER DECODER

(75) Inventors: Kenneth R. Zak, Jr., Traverse City, MI (US); Timothy J. Weadock, Traverse City, MI (US); Karl J. Mikula, Traverse City, MI (US)

(73) Assignee: The Hagerty Group, LLC, Traverse City, MI (US)

( * ) Notice: Subject to any disclaimer, the term of this patent is extended or adjusted under 35 U.S.C. 154(b) by 223 days.

(21) Appl. No.: 12/853,849

(22) Filed: Aug. 10, 2010

(65) Prior Publication Data

US 2012/0041968 A1 Feb. 16, 2012

(51) Int. Cl.
*G06F 17/30* (2006.01)
*G06F 17/00* (2006.01)

(52) U.S. Cl.
USPC .......... 707/705; 707/899; 701/29.6; 340/10.6

(58) Field of Classification Search
USPC ................... 707/705, 899; 701/1, 35; 705/1
See application file for complete search history.

(56) References Cited

U.S. PATENT DOCUMENTS

| | | | |
|---|---|---|---|
| 6,259,354 B1 * | 7/2001 | Underwood | 340/10.6 |
| 7,421,322 B1 * | 9/2008 | Silversmith et al. | 701/29.6 |
| 2008/0228512 A1 * | 9/2008 | Calkins et al. | 705/1 |

OTHER PUBLICATIONS

Website for "OldsVIN—The Postwar Oldsmobile VIN Decoder 1946-1997", http://v8cars.hu/oldsvin/vin.php, last viewed Jan. 11, 2011.
Website for "Decode this—Universal Collector Car VIN Decoder", http://www.decodethis.com/Home/tabid/36/Default.aspx,last last viewed Jan. 11, 2011.
Website for "Mopar VIN Decoder", http://www.jonsteiger.com/www/moparvin/, last viewed Jan. 11, 2011.

* cited by examiner

*Primary Examiner* — Yicun Wu
(74) *Attorney, Agent, or Firm* — Brinks Hofer Gilson & Lione (57) ABSTRACT

A VIN decoder system includes a VIN decoder configured to search a database for a vehicle type associated with the received VIN, determine a VIN structure associated with the vehicle type, parse the received VIN according to the VIN structure to identify one or more VIN elements of the received VIN. The VIN decoder then determines VIN element descriptions associated with values of the one VIN elements and communicates the information that includes the VIN element descriptions to the user.

20 Claims, 8 Drawing Sheets

VEHICLE IDENTIFICATION NUMBER DECODER

TECHNICAL FIELD

This application relates to vehicle identification number (VIN) decoder systems. Specifically, this application relates to a VIN decoder system that decodes non-standard VINs.

BACKGROUND

Vehicle identification numbers (VINs) are alphanumeric digits placed on automobiles for identifying a vehicle and for determining characteristics of a vehicle. A VIN number is typically located below the front windshield of an automobile for easy identification.

Since about 1981, the VIN for all vehicles has been standardized. Each digit or group of digits has a specific meaning. For example, the first three digits of the VIN are utilized to determine the manufacturer of the vehicle. The tenth digit specifies the year of manufacture. Other digits correspond to a unique serial number that enables identifying a specific vehicle.

The standardized aspect of VINs has enabled the generation of web-based interfaces for determining information associated with a VIN. These interfaces enable, for example, a used car purchaser to verify information provided by a seller, such as the year of manufacture. The uniqueness of the VIN enables a user to determine, for example, whether an automobile is stolen or whether the automobile was in an accident. Other information may be ascertained.

Prior to 1981, however, VIN numbers were not standard. The number of digits in VINs varied between manufacturers. Additionally, the significance of the digits of the VINs varied. In some cases, specific manufacturers varied the structure of the VIN from year to year. These inconsistencies make it difficult to decode a VIN for vehicles manufactured prior to 1981. In some instances, significant searching of automobile literature and other detective work is required to decode such VINs.

BRIEF DESCRIPTION OF THE DRAWINGS

The accompanying drawings are included to provide a further understanding of the claims and are incorporated in and constitute a part of this specification. The detailed description and illustrated embodiments serve to explain the principles of the claims.

DETAILED DESCRIPTION

The embodiments below describe an exemplary VIN decoder system. The VIN decoder system includes a VIN decoder configured to receive a non-standardized VIN from a user, and to return VIN information that specifies information defined by the VIN. The VIN decoder is configured to search a database for a vehicle type associated with the received VIN, determine a VIN structure associated with the vehicle type, and parse the received VIN according to the VIN structure to identify one or more VIN elements of the received VIN. The VIN decoder then determines VIN element descriptions associated with values of the VIN elements and communicates information that includes the VIN element descriptions to the user.

Figure 1:
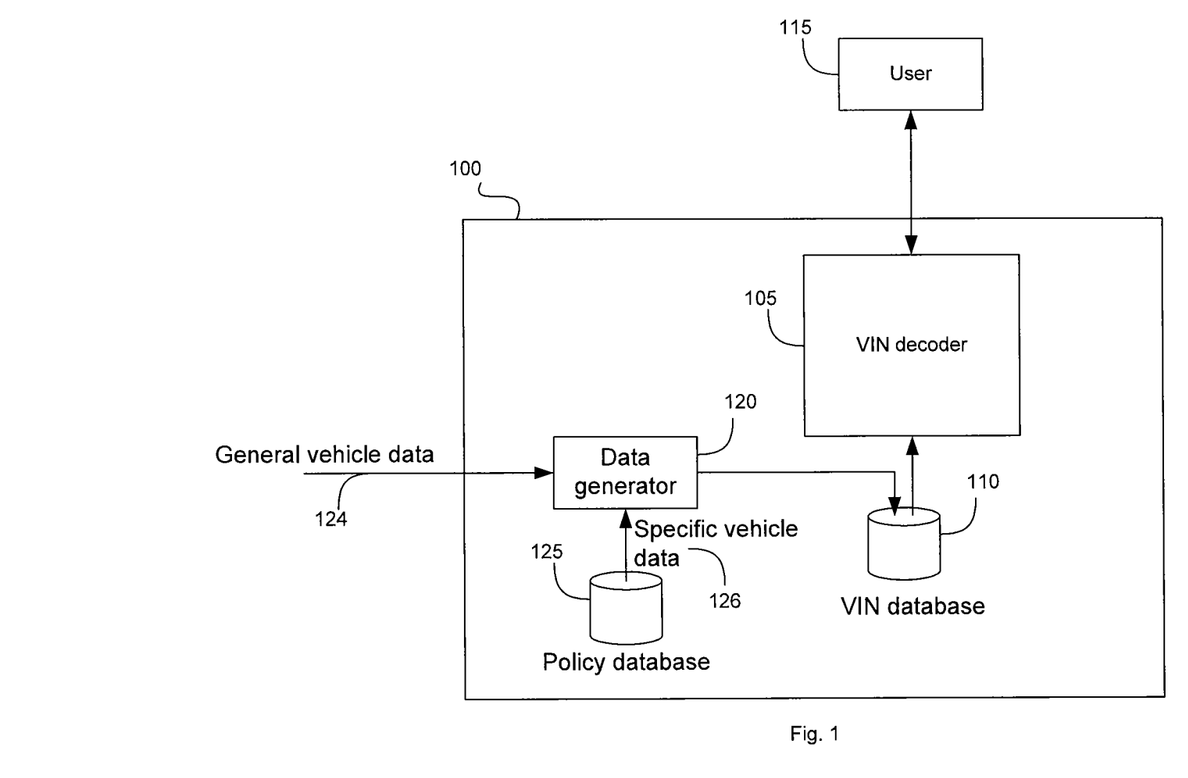
FIG. 1 illustrates an exemplary vehicle identification number (VIN) decoder system.

FIG. 1 is an exemplary vehicle identification number (VIN) decoder system 100. The VIN decoder system 100 includes a VIN decoder module 105, a data generator 120, a VIN database 110, and a policy database 125. The VIN decoder module 105 (hereinafter referred to as the VIN decoder 105) and data generator 120 may correspond to Intel®, AMD®, or PowerPC® based computer systems or different computer systems. The VIN decoder 105 and the data generator 120 may correspond to a single computer system or different computer systems interconnected by a communication network. The VIN decoder 105 and data generator 120 may include an operating system, such as a Microsoft Windows®, Linux, or other Unix® based operating system. The VIN decoder 105 and data generator 120 may be configured to communicate with other computers via an interface, such as a network interface.

The VIN decoder 105 may include code, logic, and/or other circuitry that enables receiving a VIN information request from a user 115 and serving the information to the user 115. For example, the VIN decoder 105 may implement a web server configured to communicate a web page that enables a user 115 to specify a VIN. The VIN decoder 105 is configured to search through a VIN database 110 to determine vehicle information associated with the received VIN, and to communicate a web page with the vehicle information to the user 115. The VIN decoder 105 may alternatively or additionally implement a web services interface that enables other computer systems to request VIN information. The information stored in the VIN database 110 may have been generated by the data generator 120. Generation of the information is described in more detail below.

Figure 2:
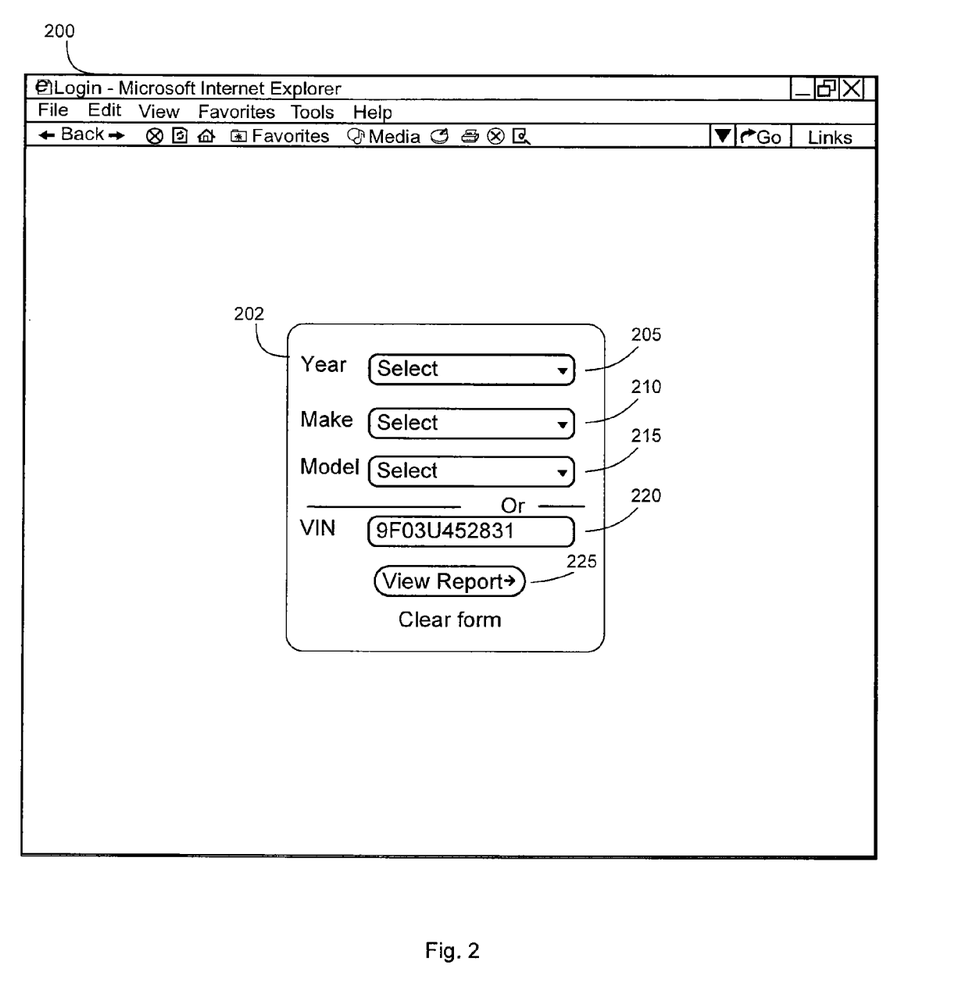
FIG. 2 illustrates an exemplary VIN specification web page for specifying a VIN.

FIG. 2 illustrates an exemplary VIN specification web page 200 for specifying a VIN number that may be communicated by the VIN decoder 105 (FIG. 1). The VIN specification web page 200 includes a VIN widget 202 that enables a user 115 (FIG. 1) to request a vehicle report associated with data entered via the VIN widget 202. The VIN widget 202 may include a year field 205, a make field 210, and a model field 215 that enables specifying a year, make, and model, respectively, of a vehicle for which the user 115 desires a report. The VIN widget 202 also includes a VIN field 220 for specifying a vehicle VIN for which he desires a report. After entering the information, the user 115 selects a view report button 225 to send the information to the VIN decoder 105.

Figure 3:
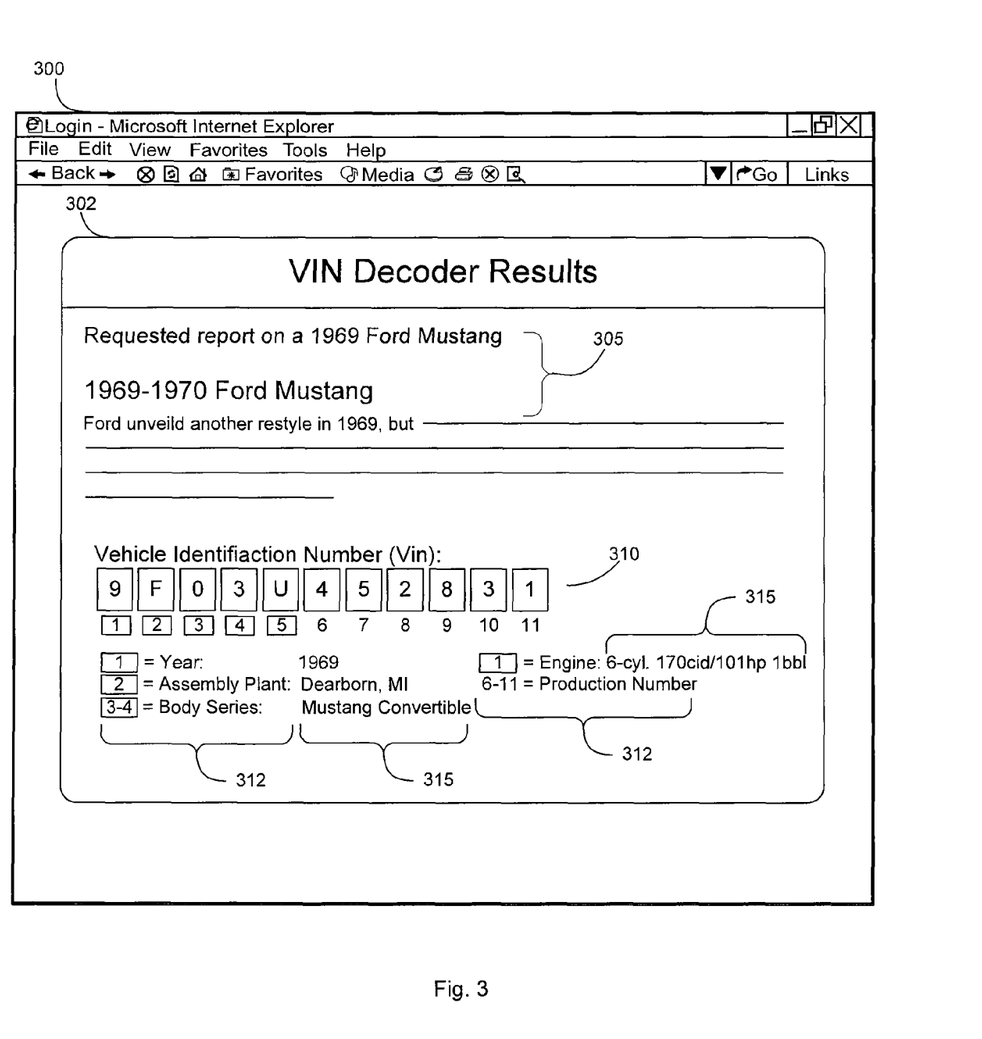
FIG. 3 illustrates an exemplary VIN report web page that may be communicated to a user.

FIG. 3 illustrates an exemplary VIN report web page 300 that may be communicated to a user 115 (FIG. 1) after the VIN decoder 105 (FIG. 1) identifies the vehicle type associated with the VIN specified by the user 115. The VIN report web page 300 includes a VIN report widget 302 that specifies information about the VIN. The information may include a brief overview 305 of the vehicle type. The information may also include the identified VIN 310, which may correspond to the VIN specified by the user 115. The information may also include VIN structure information 312, and VIN value descriptions 315. The VIN structure information 312 displays information that enables determining the VIN elements of the identified VIN 310. The meaning of the respective VIN elements may be different for different vehicle types. For the exemplary vehicle of FIG. 2, the first VIN element is comprised of the first digit. The value of the first VIN element specifies the year of manufacture of the vehicle associated with the identified VIN 310. The second VIN element is comprised of the second digit. The value of the second VIN element specifies the assembly plant of the vehicle. The third VIN element is comprised of the third and fourth digits. The value of the third VIN element specifies the body series of the vehicle. Other information may be specified. The VIN structure information 312 enables the user 115 to ascertain the information available in a given VIN.

The VIN value descriptions 315 specify descriptions associated with the values of the various VIN elements. For example, the value 9 for the first VIN element corresponds to the year 1969. The value F for the second VIN element corresponds to an assembly plant in Dearborn, Mich. The value 03 in the third VIN element corresponds to a Mustang convertible body series.

Figure 4:
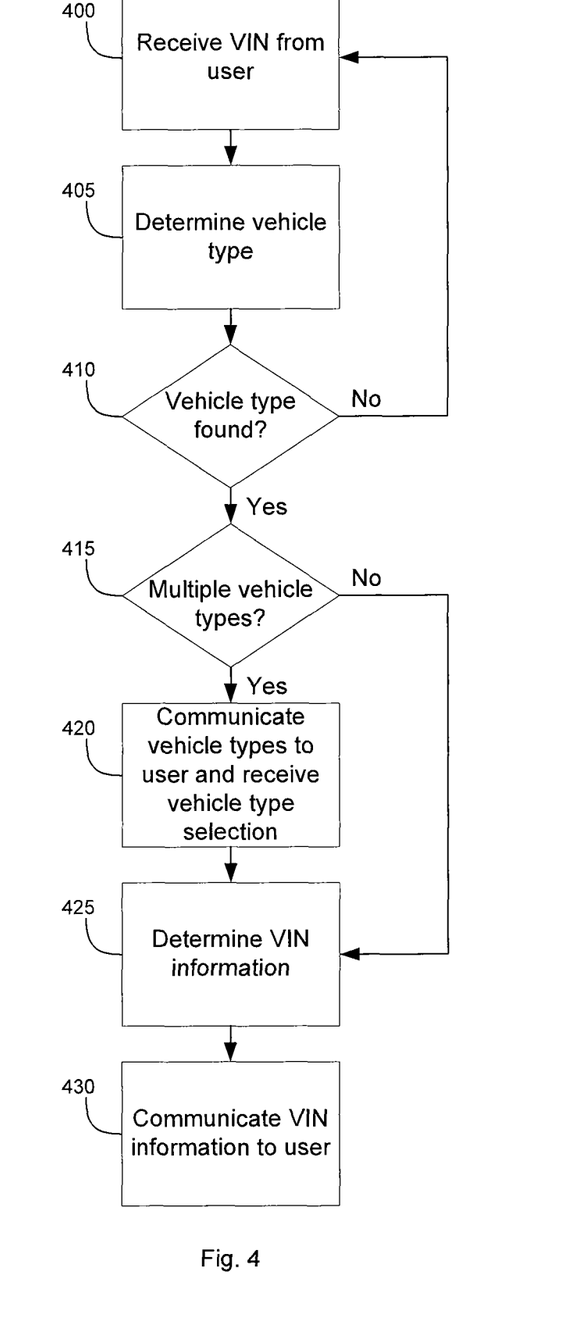
FIG. 4 illustrates exemplary operations that may be performed by a VIN decoder of the VIN decoder system.

FIG. 4 illustrates exemplary operations that may be performed by the VIN decoder 105 of FIG. 1 in determining VIN information. At block 400, a VIN is received. For example, a VIN specification web page 200 (FIG. 2) may be communicated to the user 115. The VIN specification web page 200 may include a VIN widget 202 that enables entry of a VIN. The user 115 may enter a VIN and select a view report button 225 (FIG. 2), which in turn causes the VIN to be communicated to the VIN decoder 105.

At block 405, the VIN decoder 105 determines a vehicle type associated with the received VIN by searching for a matching vehicle type in a VIN database 110. The operations at block 405 are described in more detail below.

At block 410, if a matching vehicle type is found, then at block 425, VIN information associated with the vehicle type is determined. For example, the VIN decoder 105 determines the VIN structure associated with the vehicle type. This enables the VIN decoder 105 to locate the VIN elements of the VIN. The VIN decoder 105 then determines VIN value descriptions associated with the values of the VIN elements. Operations that occur at block 425 are described in more detail below.

In an alternative embodiment, if multiple vehicle types match the received VIN, then at block 410, a web page with the vehicle types may be communicated to the user. The user may then select the a vehicle type of interest. The selection may be communicated back to the VIN decoder 105 and the operations at block 425 may proceed.

At block 430, VIN information may be communicated to the user 115 (FIG. 1). For example, the information described above with reference to FIG. 3 may be communicated to the user.

Figure 5:
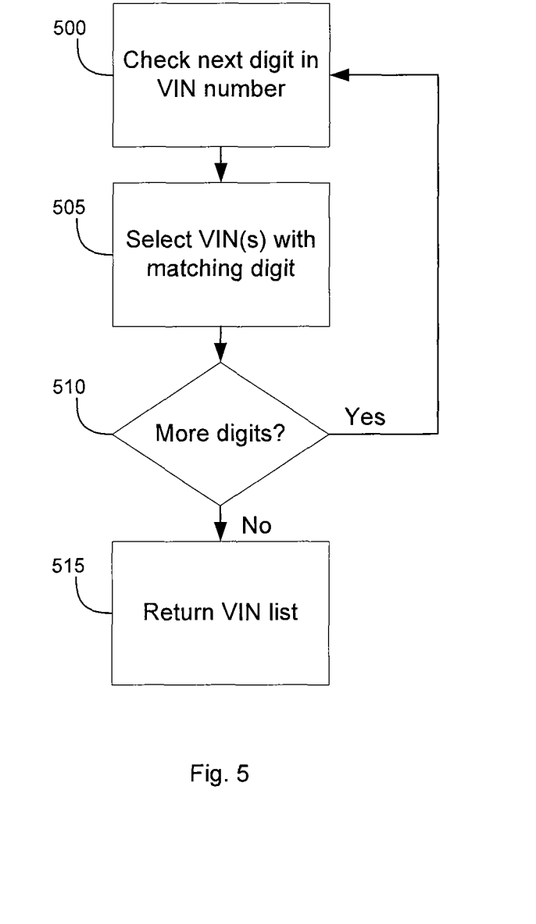
FIG. 5 illustrates exemplary operations for determining a vehicle type that may be used in conjunction with the exemplary operations of FIG. 4.

FIG. 5 illustrates exemplary operations that may be performed by the VIN decoder 105 at block 405 in determining the vehicle type associated with the received VIN. At block 500, the VIN decoder 105 analyzes a first digit of VIN ranges stored in a database table of the VIN database 110. Table 1 below illustrates an exemplary portion of a database table with VIN ranges that may be analyzed.

TABLE 1

| Vehicle ID | VinRangeID | VinBeginRange | VinEndRange |
|---|---|---|---|
| 6121 | 103395 | 9F03S000000 | 9F03S999999 |
| 6121 | 103396 | 9F03T000000 | 9F03T999999 |
| 6121 | 103397 | 9F03U000000 | 9F03U999999 |
| 6121 | 103407 | 9R012000000 | 9R012999999 |
| 6122 | 103407 | 8X0F12000000 | 8X0F2999999 |

The vehicle ID column specifies an ID that uniquely identifies a specific vehicle type. The VinRangeID column specifies an ID that uniquely identifies specific VIN ranges. The VinBeginRange and VinEndRange columns specify valid VIN ranges for the vehicle type in the vehicle ID column. As shown, a given vehicle type may be associated with non-overlapping groups of VIN ranges. The VIN decoder 105 compares the first digit of the received VIN with the first digit of each VIN range in the table.

At block 505, the VIN decoder 105 selects VIN ranges that have a first digit that matches the first digit of the received VIN.

At block 510, if there are more VIN digits to compare, the operations at block 500 repeat except that the second digit of the received VIN is compared with the second digit of the VIN ranges selected at block 505. These operations repeat until all the digits in the received VIN are compared with the digits in the VIN range.

At block 515, the vehicle type associated with the VIN range that matches the received VIN is returned. In some instance, more than one vehicle type may be associated with the same VIN range. In some embodiments, the first vehicle type that matches is returned. In other embodiments, a list of matching vehicle types is returned and the user may be given the option of selecting a vehicle type.

Figure 6:
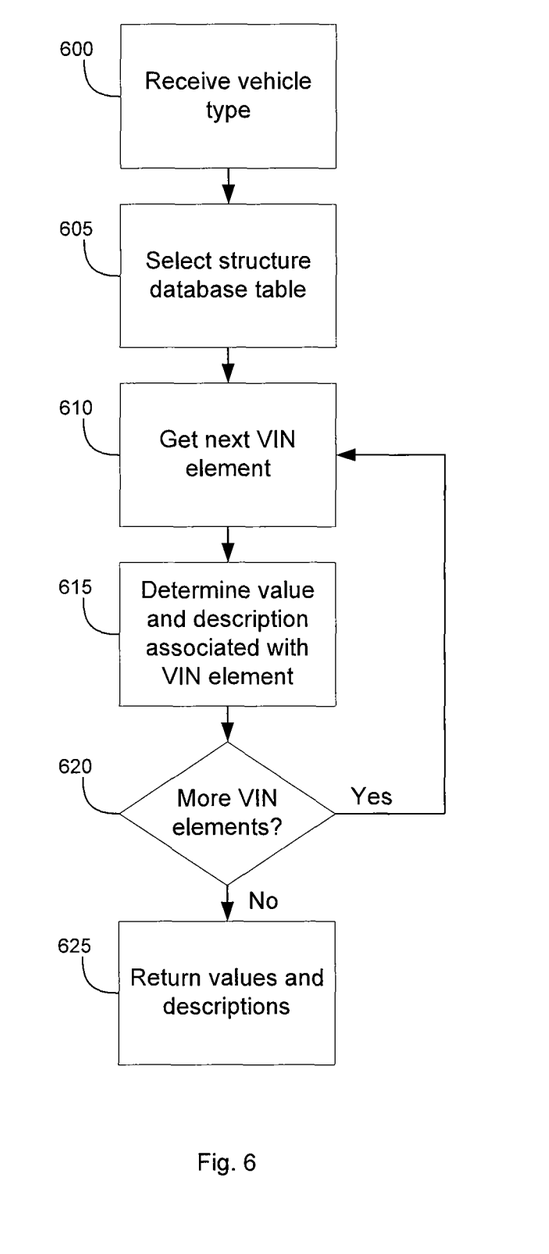
FIG. 6 illustrates exemplary operations for determining VIN information that may be used in conjunction with the exemplary operations of FIG. 4.

FIG. 6 illustrates exemplary operations that may be performed by the VIN decoder 105 at block 425, described above. At block 600, a vehicle type is received. The vehicle type may correspond to the vehicle type ID identified at block 515 above.

At block 605, a database table that defines the structure of the VIN associated with the vehicle type is selected. Table 2 illustrates an exemplary structure table that may be stored in the VIN database 110 (FIG. 1).

TABLE 2

| Vehicle ID | VinRangeID | BeginDigit | EndDigit | VINElement |
|---|---|---|---|---|
| 6121 | 103397 | 1 | 1 | Year |
| 6121 | 103397 | 2 | 2 | Assembly Plant |
| 6121 | 103397 | 3 | 4 | Body Series |
| 6121 | 103397 | 5 | 5 | Engine |
| 6121 | 103397 | 6 | 11 | Production Number |

The Vehicle ID and VinRangeID may correspond to the Vehicle ID and VINRangeID, respectively, of Table 1. The BeginDigit and EndDigit columns specify the location of the VIN elements within the VIN range. The VINElement column specifies names associated with the VIN elements. Collectively, the respective columns define the structure of a VIN range associated with the vehicle type. For example, the first VIN element comprises the first digit in the VIN range associated with the vehicle type 6121. The value of the first VIN element specifies the year of manufacture. The second VIN element comprises the second digit. The value of the second VIN element specifies an assembly plant. The third VIN element comprises the third and fourth digits. The value of third VIN element specifies a body series. The fourth VIN element comprises the fifth digit. The value of the fourth VIN element specifies an engine type, and the fifth VIN element comprises the sixth through eleventh digits and specifies the production number.

At block 610, a first VIN element is selected.

At block 615, a database table that specifies values and value descriptions for each VIN element searched. Table 3 illustrates an exemplary database table that specifies descriptions for various values of VIN elements. The database table may be stored in the VIN database 110 (FIG. 1).

TABLE 3

| Vehicle ID | VinRangeID | VINElement | Value | Value Description |
|---|---|---|---|---|
| 6121 | 103397 | Year | 1 | 1969 |
| 6121 | 103397 | Year | 2 | 1970 |
| 6121 | 103397 | Year | 3 | 1971 |
| 6121 | 103397 | Assembly plant | 1 | Flint, MI |
| 6122 | 103397 | Assembly plant | 2 | Dearborn, MI |
| 6122 | 103397 | Body series | 45 | Mustang Convertible |

The Vehicle ID and VinRangeID may correspond to the Vehicle ID and VINRangeID, respectively, discussed above with reference to Table 1. The VINElement column corresponds to the VINElement column of Table 2. The value column and value description column may correspond to values and associated descriptions of the values, respectively, represented by VIN elements. For example, valid values for the VINElement "year" may include the values 1-3, which correspond to the years 1969-1971, respectively. Valid values for the VIN element "assembly plant" may include the values 1 and 2, which correspond to assembly plants in Flint, Mich., and Dearborn, Mich., respectively.

At block 620, if more VINElements are specified in the VIN, then the operations repeat from block 610 until all the values and descriptions associated with the VIN elements are determined.

At block 625, the VIN values and descriptions are returned. Information that defines the structure of the VIN may also be returned.

Figure 7:
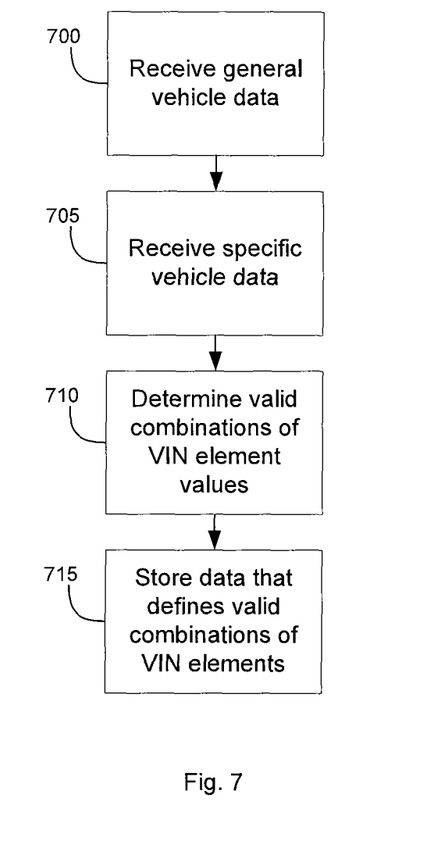
FIG. 7 illustrates a group of exemplary operations that may be performed by a data generator of the VIN decoder system that generates VIN information.

FIG. 7 illustrates a group of exemplary operations that may be performed by the data generator 120. At block 700 general vehicle data 124 may be received. For example, information that defines VIN ranges for various vehicle types may be received. The information may be derived from various sources, such as the manufacturer, literature or guides associated with vehicles, or other sources. The information may be communicated to the data generator 120 via terminals through which data entry personnel enter information.

At block 705, specific vehicle data 126 may be received. For example, the data generator 120 may be in communication with a policy database 125 or other database that stores information that includes a VIN and other characteristics associated with a vehicle of a specific type. In some implementations, the policy database 125 includes information related to a number of insurance policies for insuring vehicles. As such, the specific information about the vehicle may include the vehicles VIN, make, model, model year, color, etc.

At block 710, the specific vehicle data 126 and general vehicle data 124 may be analyzed to determine valid combinations of VIN elements and values specified by VIN elements. For example, the general vehicle data 124 may define VIN ranges for a specific vehicle type and may specify VIN elements and VIN element values within the VIN ranges for the vehicle type, such as all the assembly plants that produced the vehicle and all the model years the vehicle was in production. However, it may be the case that the vehicle was built in different plants during different years, so that only certain combinations of the assembly plants and the production years are valid. The general vehicle data 124 may not be refined enough to determine these valid combinations. However, the specific vehicle data 126 for a specific car may include an actual VIN for a vehicle of the vehicle type. The combinations of VIN elements and VIN values for the actual VIN are valid and can, therefore, be utilized to determine the valid combinations of VIN elements and VIN values of the VIN ranges specified by the general vehicle data 124.

At block 715, data that defines the valid combinations of VIN elements and VIN values is stored. For example, the data generator 120 may generate one or more of the exemplary database tables described above based on the general vehicle data 124 and specific vehicle data 126 and store the database tables to the VIN database 110.

Figure 8:
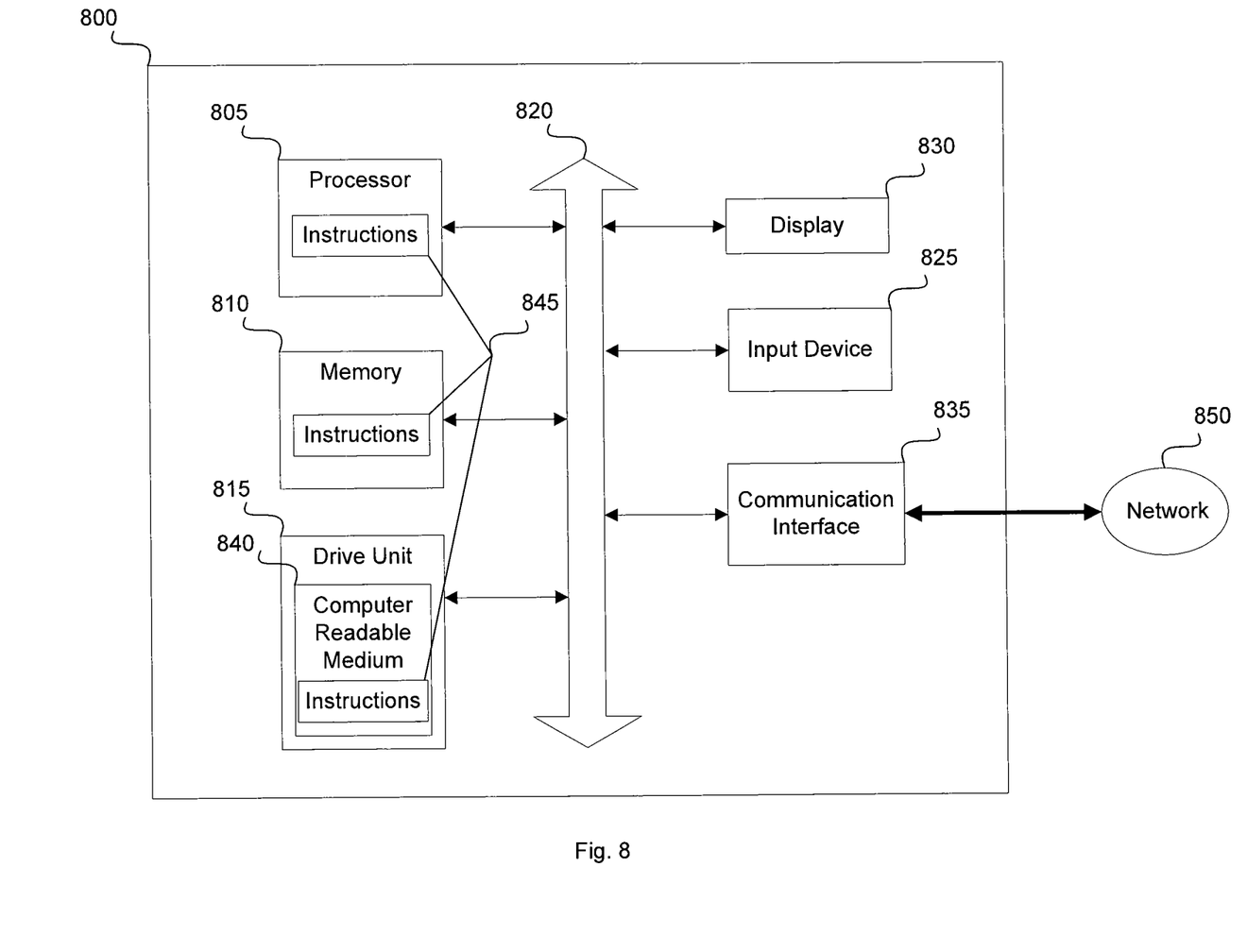
FIG. 8 illustrates a general computer system that may represent any of the computing devices referenced herein.

FIG. 8 illustrates a general computer system 800, which may represent the VIN decoder 105, the data generator 120, or any other computing devices referenced herein. The computer system 800 may include a set of instructions 845 that may be executed to cause the computer system 800 to perform any one or more of the methods or computer-based functions disclosed herein. The computer system 800 may operate as a stand-alone device or may be connected, e.g., using a network, to other computer systems or peripheral devices.

In a networked deployment, the computer system 800 may operate in the capacity of a server or as a client-user computer in a server-client user network environment, or as a peer computer system in a peer-to-peer (or distributed) network environment. The computer system 800 may also be implemented as or incorporated into various devices, such as a personal computer or a mobile device, capable of executing a set of instructions 845 (sequential or otherwise) that specify actions to be taken by that machine. Further, each of the systems described may include any collection of sub-systems that individually or jointly execute a set, or multiple sets, of instructions to perform one or more computer functions.

The computer system 800 may include one or more memory devices 810 on a bus for communicating information, such as the VIN database 110 (FIG. 1) and the policy database 125 (FIG. 1). In addition, code operable to cause the computer system to perform any of the acts or operations described herein may be stored in the memory 810. The memory 810 may be a random-access memory, read-only memory, programmable memory, hard disk drive or any other type of memory or storage device.

The computer system 800 may include a display 830, such as a liquid crystal display (LCD), a cathode ray tube (CRT), or any other display suitable for conveying information. The display 830 may act as an interface for the user to see the functioning of the processor 805, or specifically as an interface with the software stored in the memory 810 or in the drive unit 815.

Additionally, the computer system 800 may include an input device 825, such as a keyboard or mouse, configured to allow a user to interact with any of the components of system 800.

The computer system 800 may also include a disk or optical drive unit 815, such as the high-latency storage 110 (FIG. 1). The disk drive unit 815 may include a computer-readable medium 840 in which one or more sets of instructions 845, e.g. software, can be embedded. Further, the instructions 845 may perform one or more of the operations as described herein. The instructions 845 may reside completely, or at least partially, within the memory 810 and/or within the processor 805 during execution by the computer system 800. The memory 810 and the processor 805 also may include computer-readable media as discussed above.

The computer system 800 may include a communication interface 835 that enables communications via a network 850. The network 850 may include wired networks, wireless networks, or combinations thereof. The communication interface 835 network may enable communications via any number of communication standards, such as 802.11, 802.12, 802.20, WiMax, cellular telephone standards, or other communication standards.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

As shown above, the VIN decoder system overcomes the problems described above associated with VIN from vehicles manufactured before 1981. For example, the VIN decoder system includes a VIN decoder configured to search a database for a vehicle type associated with the received VIN, determine a VIN structure associated with the vehicle type, parse the received VIN according to the VIN structure to identify one or more VIN elements of the received VIN. The VIN decoder then determines VIN element descriptions associated with values of the one VIN elements and communicates the information that includes the VIN element descriptions to the user.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. A method for decoding a vehicle identification number (VIN), the method comprising:
    receiving a vehicle identification number (VIN);
    searching a database that relates a plurality of vehicle types with a plurality of VIN structures for a vehicle type associated with the received VIN, wherein a VIN structure defines a type of VIN element and a location of the VIN element within the VIN, wherein each VIN element defines attributes associated with the vehicle type, wherein a first VIN structure in the database defines a location for a VIN element associated with a first attribute to be in a first location, and a second VIN structure in the database defines a location for a VIN element associated with a same attribute to be in a location that is different than the first location;
    determining a VIN structure associated with the vehicle type;
    parsing the received VIN according to the VIN structure to identify one or more VIN elements of the received VIN;
    determining one or more VIN element descriptions associated with values of the one or more VIN elements; and
    communicating search results that include at least some of the one or more VIN element descriptions to a user.

2. The method according to claim 1, wherein the database includes a first table that associates a VIN range with the vehicle type, a second table that defines a structure of the VIN range, and a third table that defines VIN element descriptions associated with VIN elements.

3. The method according to claim 1, wherein the search results include a manufacturer of the vehicle type.

4. The method according to claim 1, further comprising communicating a plurality of vehicle types to a user when more than one vehicle type is associated with the received VIN.

5. The method according to claim 4, further comprising receiving a selection of a vehicle type.

6. The method according to claim 1, further comprising communicating a list of valid values associated with the one or more VIN elements when values of the VIN are not received.

7. The method according to claim 1, wherein searching a database for a vehicle type associated with the received VIN number comprises:
    successively comparing each digit of the received VIN with a corresponding digit of one or more VIN ranges stored in the database until a unique VIN range that most closely matches the received VIN number is located.

8. The method according to claim 1, further comprising:
    receiving vehicle data that defines VIN structures and VIN element values for vehicle types;
    receiving specific vehicle data that defines a VIN number of a specific vehicle and attributes of the specific vehicle;
    determining valid combinations of the VIN element values of the vehicle data based on the specific vehicle data; and
    storing data that defines the valid combinations of the VIN element values to the database.

9. A system configured to decode a vehicle identification number (VIN) comprising:
    a processor;
    a memory coupled to the processor that stores instructions that cause the processor to:
    receive a vehicle identification number (VIN);
    search a database that relates a plurality of vehicle types with a plurality of VIN structures for a vehicle type associated with the received VIN, wherein a VIN structure defines a type of VIN element and a location of the VIN element within the VIN, wherein each VIN element defines attributes associated with the vehicle type, wherein a first VIN structure in the database defines a location for a VIN element associated with a first attribute to be in a first location, and a second VIN structure in the database defines a location for a VIN element associated with a same attribute to be in a location that is different than the first location;

determine a VIN structure associated with the vehicle type;
parse the received VIN according to the VIN structure to identify one or more VIN elements of the received VIN;
determine one or more VIN element descriptions associated with values of the one or more VIN elements; and
communication hardware configured to communicate search results that include at least some of the one or more VIN element descriptions to a user.

10. The system according to claim 9, wherein the database includes a first table that associates a VIN range with the vehicle type, a second table that defines a structure of the VIN range, and a third table that defines VIN element descriptions associated with VIN elements.

11. The system according to claim 9, wherein the search results include a manufacturer of the vehicle type.

12. The system according to claim 9, wherein the VIN decoder is configured to communicate a plurality of vehicle types to a user when more than one vehicle type is associated with the received VIN.

13. The system according to claim 12, wherein the VIN decoder is configured to receive a selection of a vehicle type.

14. The system according to claim 9, wherein the VIN decoder is configured to communicate a list of valid values associated with the one or more VIN elements when values of the VIN are not received.

15. The system according to claim 9, wherein the VIN decoder is configured to successively compare each digit of the received VIN with a corresponding digit of one or more VIN ranges stored in the database until a unique VIN range that most closely matches the received VIN number is located.

16. The system according to claim 9, further comprising:
a data generator configured to:
receive vehicle data that defines VIN structures and VIN element values for vehicle types;
receive specific vehicle data that defines a VIN number of a specific vehicle and attributes of the specific vehicle;
determine valid combinations of the VIN element values of the vehicle data based on the specific vehicle data; and
store data that defines the valid combinations of the VIN element values to the database.

17. A non-transitory machine-readable storage medium having stored thereon a computer program comprising at least one code section for operating a vehicle identification number (VIN) decoder system, the at least one code section being executable by a machine for causing the machine to perform acts of:
receiving a vehicle identification number (VIN);
searching a database that relates a plurality of vehicle types with a plurality of VIN structures for a vehicle type associated with the received VIN, wherein a VIN structure defines a type of VIN element and a location of the VIN element within the VIN, wherein each VIN element defines attributes associated with the vehicle type, wherein a first VIN structure in the database defines a location for a VIN element associated with a first attribute to be in a first location, and a second VIN structure in the database defines a location for a VIN element associated with a same attribute to be in a location that is different than the first location;
determining a VIN structure associated with the vehicle type;
parsing the received VIN according to the VIN structure to identify one or more VIN elements of the received VIN;
determining one or more VIN element descriptions associated with values of the one or more VIN elements; and
communicating search results that include at least some of the one or more VIN element descriptions to a user.

18. The non-transitory machine-readable storage medium according to claim 17, wherein the database includes a first table that associates a VIN range with the vehicle type, a second table that defines a structure of the VIN range, and a third table that defines VIN element descriptions associated with VIN elements.

19. The non-transitory machine-readable storage medium according to claim 17, wherein the search results include a manufacturer of the vehicle type.

20. The non-transitory method according to claim 17, the at least one code section is operable to cause the machine to perform acts of:
receiving vehicle data that defines VIN structures and VIN element values for vehicle types;
receiving specific vehicle data that defines a VIN number of a specific vehicle and attributes of the specific vehicle;
determining valid combinations of the VIN element values of the vehicle data based on the specific vehicle data; and
storing data that defines the valid combinations of the VIN element values to the database.

* * * * *